(12) United States Patent
Owen et al.

(10) Patent No.: US 11,269,533 B2
(45) Date of Patent: Mar. 8, 2022

(54) PERFORMING OBJECT CONSOLIDATION WITHIN A STORAGE SYSTEM

(71) Applicant: International Business Machines Corporation, Armonk, NY (US)

(72) Inventors: William W. Owen, Tucson, AZ (US); Erik Rueger, Mainz (DE); Christof Schmitt, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 629 days.

(21) Appl. No.: 15/465,418

(22) Filed: Mar. 21, 2017

(65) Prior Publication Data

US 2018/0275877 A1 Sep. 27, 2018

(51) Int. Cl.
*G06F 3/06* (2006.01)

(52) U.S. Cl.
CPC .......... *G06F 3/0643* (2013.01); *G06F 3/0604* (2013.01); *G06F 3/0667* (2013.01); *G06F 3/0685* (2013.01)

(58) Field of Classification Search
CPC ...... G06F 3/064; G06F 3/0604; G06F 3/0643; G06F 3/0673
See application file for complete search history.

(56) References Cited

U.S. PATENT DOCUMENTS

| | | | |
|---|---|---|---|
| 7,487,228 B1* | 2/2009 | Preslan | G06F 17/30067 709/218 |
| 8,745,095 B2 | 6/2014 | Bestler et al. | |
| 8,990,257 B2 | 3/2015 | Barton et al. | |
| 9,069,799 B2 | 6/2015 | Vijayan | |
| 9,154,502 B2 | 10/2015 | Erb et al. | |
| 9,348,532 B1* | 5/2016 | Palekar | G06F 17/30079 |
| 2003/0191745 A1* | 10/2003 | Jiang | G06F 17/30067 |
| 2006/0080286 A1* | 4/2006 | Svendsen | G06F 16/58 |
| 2010/0057755 A1* | 3/2010 | Schneider | G06F 17/30067 707/E17.01 |
| 2012/0233228 A1* | 9/2012 | Barton | H04L 67/06 707/827 |
| 2013/0073688 A1* | 3/2013 | Limbasia | H04L 67/06 709/219 |
| 2013/0212432 A1* | 8/2013 | Guthrie | H04L 67/06 714/16 |
| 2014/0201160 A1 | 7/2014 | Kumarasamy et al. | |

(Continued)

FOREIGN PATENT DOCUMENTS

WO 2014195930 A1 12/2014

OTHER PUBLICATIONS

Sears et al., "To BLOB or Not to BLOB: Large Object Storage in a Database or a Filesystem," Microsoft Corporation Technical Report, Apr. 2006, pp. 1-11.

(Continued)

*Primary Examiner* — Andrew J Cheong
(74) *Attorney, Agent, or Firm* — Zilka-Kotab, P.C.

(57) ABSTRACT

A computer-implemented method according to one embodiment includes identifying a plurality of segment files within an object storage system, determining all data blocks associated with the plurality of segment files within the object storage system, and mapping all the data blocks associated with the plurality of segment files to a single new file within the object storage system.

14 Claims, 7 Drawing Sheets

(56) References Cited

U.S. PATENT DOCUMENTS

2014/0351298 A1* 11/2014 Kim .................. G06F 17/30115
707/822
2017/0262463 A1* 9/2017 Dar .................. G06F 17/30138

OTHER PUBLICATIONS

Openstack, "Large Object Support," Aug. 23, 2016, pp. 1-11, Retrieved From https://docs.openstack.org/developer/swift/overview_large_objects.html.
Openstack, "Welcome to Swift's Documentation," Jan. 2, 2017, pp. 1-5, Retrieved From https://docs.openstack.org/developer/swift/.
Amazon Web Services, "Amazon S3," Jan. 3, 2017, pp. 1-8, Retireved From https://aws.amazon.com/s3/.
IBM, "IBM Spectrum Scale," Feb. 16, 2017, pp. 1-3, Retrieved From http://www-03.ibm.com/systems/storage/spectrum/scale/.

* cited by examiner

PERFORMING OBJECT CONSOLIDATION WITHIN A STORAGE SYSTEM

BACKGROUND

The present invention relates to data storage, and more specifically, this invention relates to consolidating data associated with an object stored within an object storage system.

Object storage systems are a popular means for storing data. For example, object storage systems may utilize a clustered file system, where each uploaded object is stored in a separate file in the cluster file system. Object storage systems may have size limits on a size of each file uploaded to the object storage system. To overcome these size limits, large objects may be uploaded to the object storage system utilizing a multipart upload technique. Utilizing this technique, a single object is divided into multiple segments, where each segment is uploaded individually and saved as an individual segment file within the object storage system. This may create issues associated with file system policies, data migration, and other actions within the object storage system.

SUMMARY

A computer-implemented method according to one embodiment includes identifying a plurality of segment files within an object storage system, determining all data blocks associated with the plurality of segment files within the object storage system, and mapping all the data blocks associated with the plurality of segment files to a single new file within the object storage system.

According to another embodiment, a computer program product for performing object consolidation within an object storage system comprises a computer readable storage medium having program instructions embodied therewith, wherein the computer readable storage medium is not a transitory signal per se, and where the program instructions are executable by a processor to cause the processor to perform a method comprising identifying a plurality of segment files within the object storage system, utilizing the processor, determining all data blocks associated with the plurality of segment files within the object storage system, utilizing the processor, and mapping all the data blocks associated with the plurality of segment files to a single new file within the object storage system, utilizing the processor.

A system according to another embodiment includes a processor, and logic integrated with the processor, executable by the processor, or integrated with and executable by the processor, the logic being configured to identify a plurality of segment files within an object storage system, determine all data blocks associated with the plurality of segment files within the object storage system, and map all the data blocks associated with the plurality of segment files to a single new file within the object storage system.

Other aspects and embodiments of the present invention will become apparent from the following detailed description, which, when taken in conjunction with the drawings, illustrate by way of example the principles of the invention.

DETAILED DESCRIPTION

Figure 1:
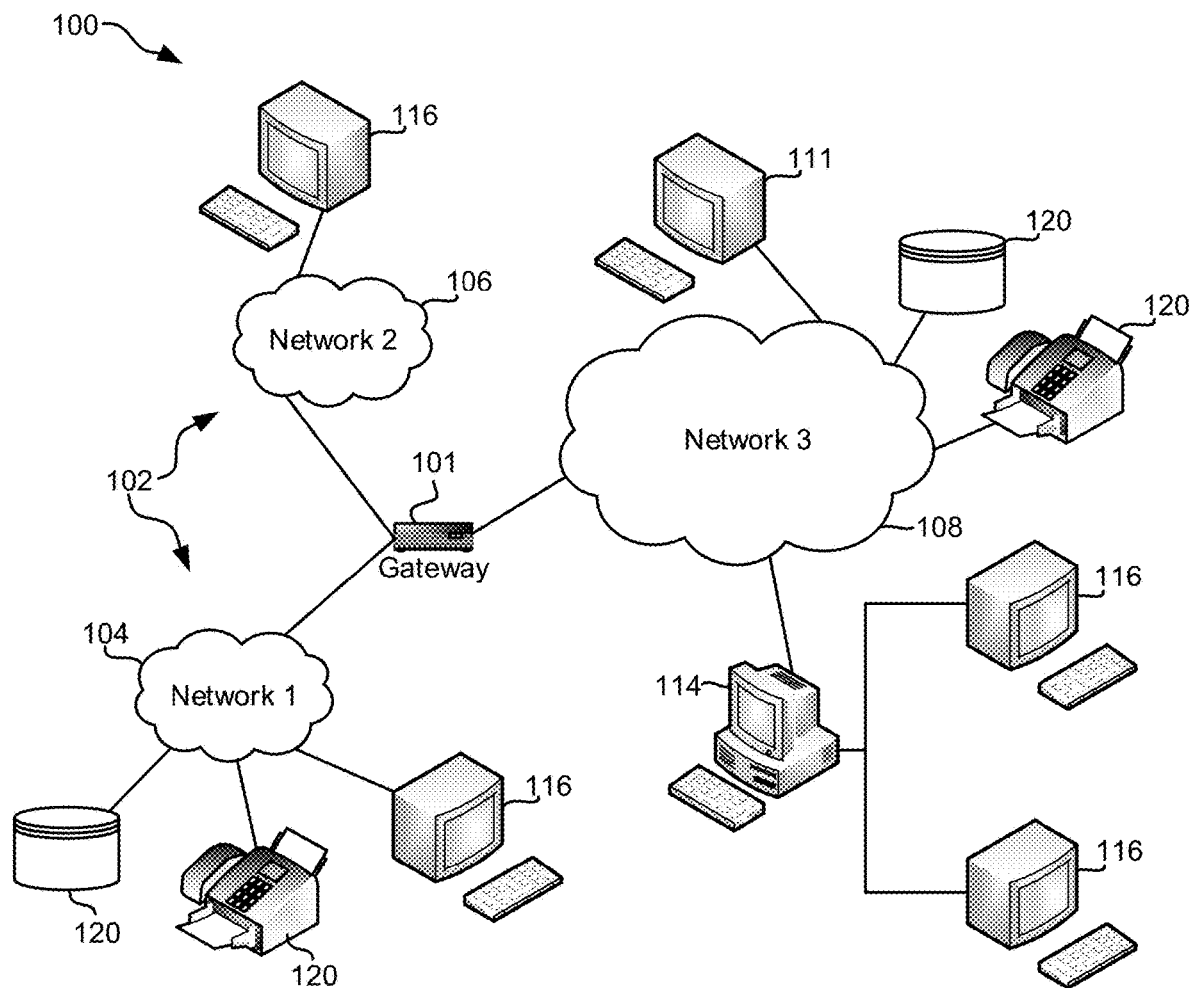
FIG. 1 illustrates a network architecture, in accordance with one embodiment.

The following description discloses several preferred embodiments of systems, methods and computer program products for performing object consolidation within a storage system. Various embodiments provide a method to identify and consolidate portions of a single object stored as segment files within an object storage system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for performing object consolidation within a storage system.

In one general embodiment, a computer-implemented method includes identifying a plurality of segment files within an object storage system, determining all data blocks associated with the plurality of segment files within the object storage system, and mapping all the data blocks associated with the plurality of segment files to a single new file within the object storage system.

In another general embodiment, a computer program product for performing object consolidation within an object storage system comprises a computer readable storage medium having program instructions embodied therewith, wherein the computer readable storage medium is not a transitory signal per se, and where the program instructions are executable by a processor to cause the processor to perform a method comprising identifying a plurality of segment files within the object storage system, utilizing the processor, determining all data blocks associated with the plurality of segment files within the object storage system, utilizing the processor, and mapping all the data blocks associated with the plurality of segment files to a single new file within the object storage system, utilizing the processor.

In another general embodiment, a system includes a processor, and logic integrated with the processor, executable by the processor, or integrated with and executable by the processor, the logic being configured to identify a plurality of segment files within an object storage system, determine all data blocks associated with the plurality of segment files within the object storage system, and map all the data blocks associated with the plurality of segment files to a single new file within the object storage system.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
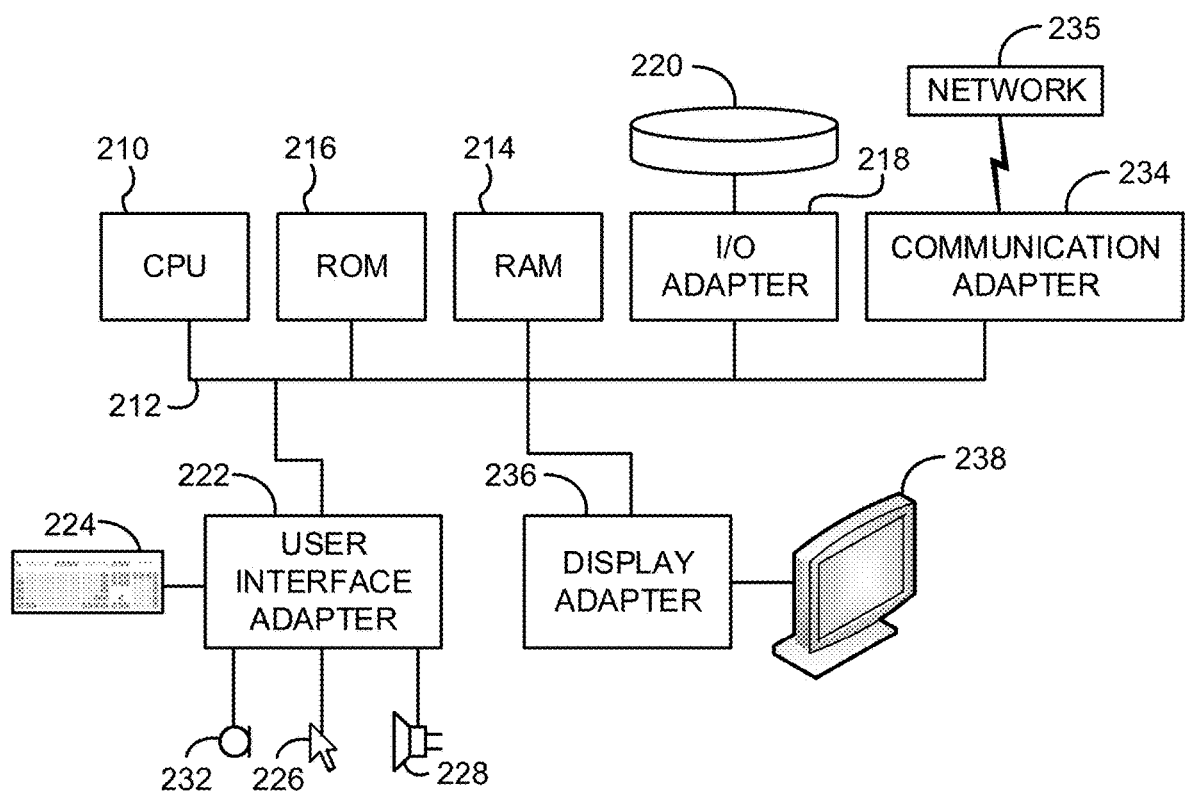
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
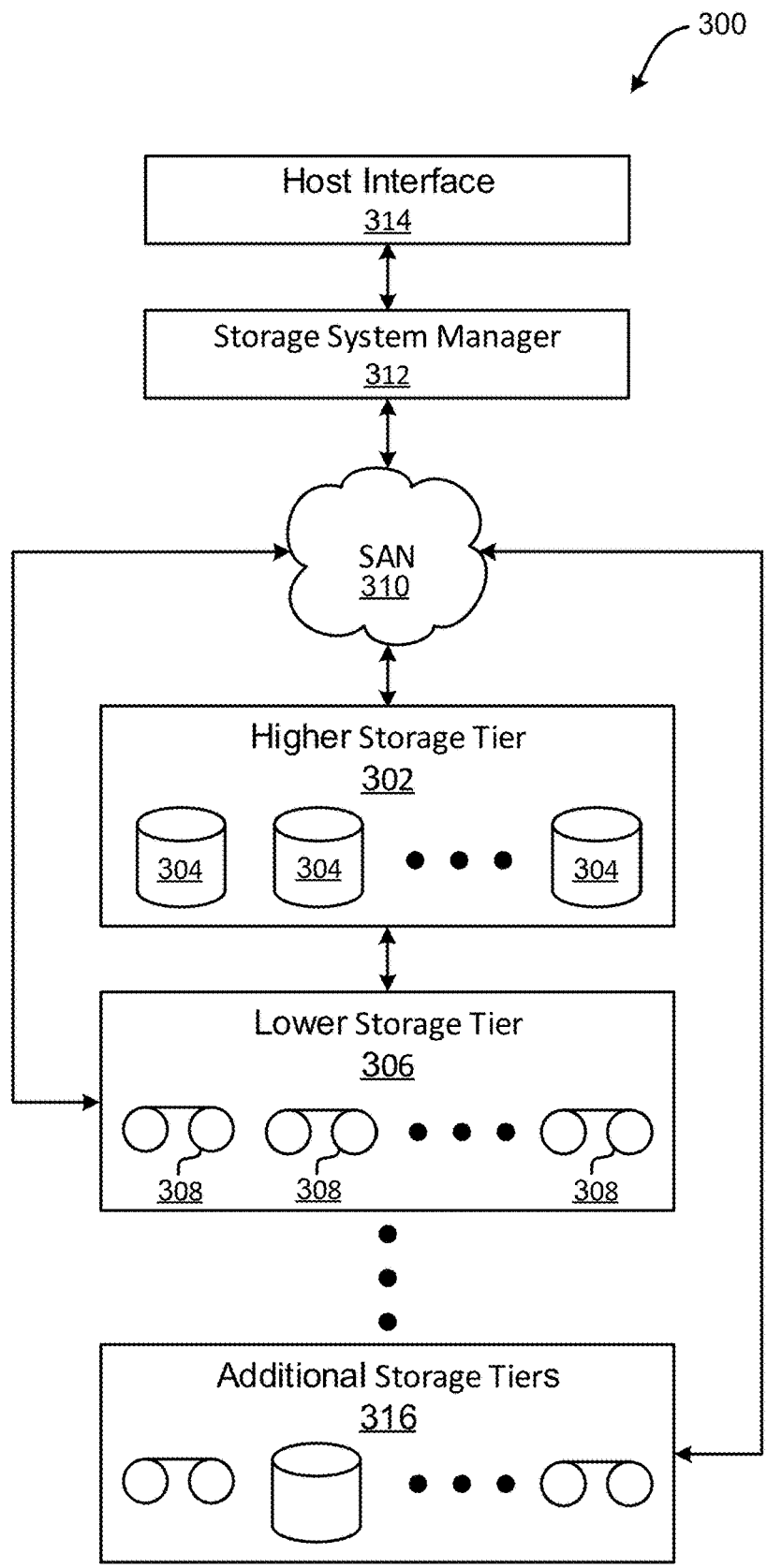
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
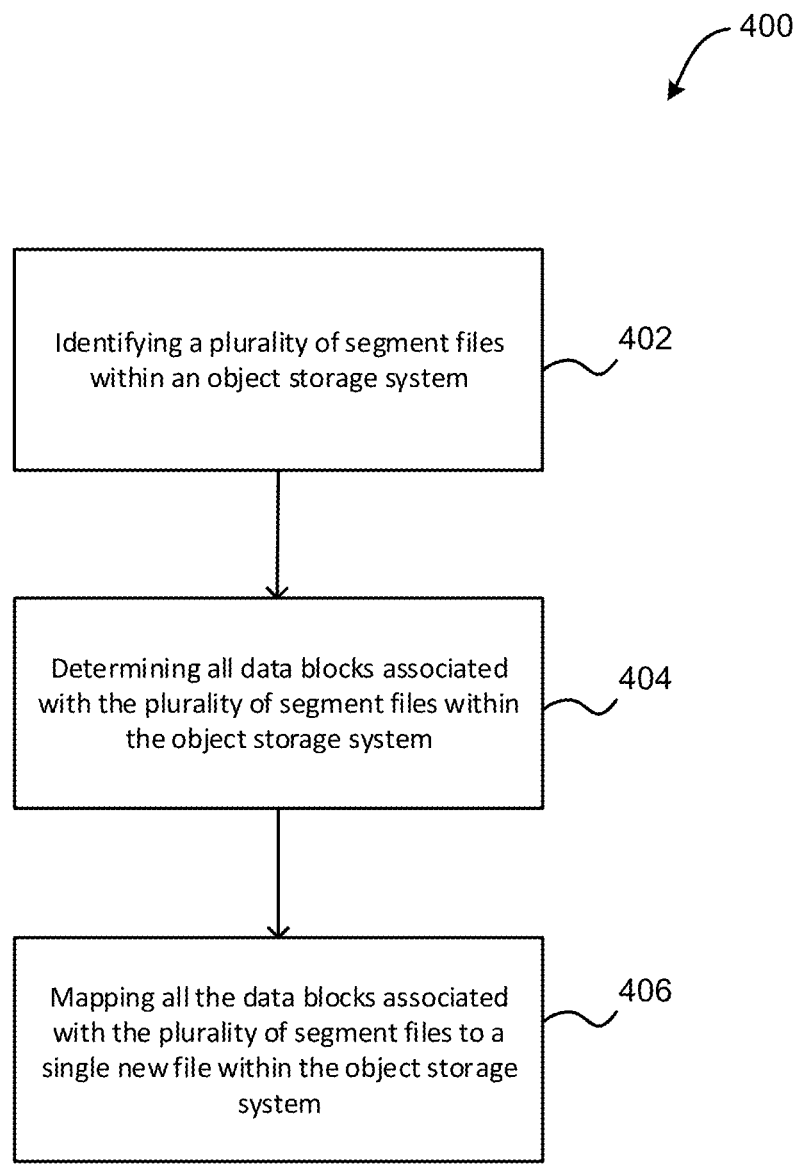
FIG. 4 illustrates a method for performing object consolidation within a storage system, in accordance with one embodiment.

Now referring to FIG. 4, a flowchart of a method 400 is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a plurality of segment files are identified within an object storage system. In one embodiment, each of the plurality of segment files may represent a portion of an object stored within the object storage system. For example, the object may be split into a plurality of segments that are uploaded to the object storage system and stored in the object storage system as the plurality of segment files. In another example, the object may be split into the plurality of segments in order to meet one or more uploading limitations associated with the object storage system (e.g., maximum allowable file sizes for upload to the object storage system, etc.). Each of these segments may then be uploaded to the object storage system, and stored as a segment file within the object storage system.

Additionally, in one embodiment, the object storage system may include a system that implements an object-based computer data storage architecture. In another embodiment, the object storage system may include a clustered file system. For example, the object storage system may include a clustered file system that includes a shared file system mounted on a plurality of servers. In yet another embodiment, the object storage system may include an object server database.

Further, in one embodiment, the plurality of segment files may be identified in response to a completion of an uploading of the plurality of segment files to the object storage system. In another embodiment, the plurality of segment files may be identified in response to a completion of an uploading of a descriptor file associated with a single object to the object storage system. For example, the descriptor file may identify each of the plurality of segment files as belonging to a single object within the object storage system.

Further still, in one embodiment, the plurality of segment files may be identified in response to a storage of the descriptor file within the object storage system. In another embodiment, the plurality of segment files may be identified in response to an identification of the descriptor file within the object storage system. For example, the identification may be performed by an independent process that scans the object storage system and notifies an agent (e.g., an application, etc.) within the object storage system when a new descriptor file is found within the object storage system. In yet another embodiment, the agent within the object storage system may identify the plurality of segment files within the object storage system. In still another embodiment, the plurality of segment files may be identified within the object storage system, utilizing the descriptor file.

Further, as shown in FIG. 4, method 400 may proceed with operation 404, where all data blocks associated with the plurality of segment files are determined within the object storage system. In one embodiment, determining all the data blocks associated with the plurality of segment files may include determining, for each of the plurality of segment files, all data blocks identified within an inode for that segment file.

For example, for each of the plurality of segment files, an inode for a segment file may include a data structure storing information about that segment file. In another example, for each of the plurality of segment files, the inode for a segment file may identify a location of all data blocks associated with that segment file. In another embodiment, the data blocks associated with each of the plurality of segment files may indicate one or more physical locations within the object storage system where data for that segment file is stored.

Further still, as shown in FIG. 4, method 400 may proceed with operation 406, where all the data blocks associated with the plurality of segment files are mapped to a single new file within the object storage system. In one embodiment, mapping all the data blocks associated with the plurality of segment files may include creating the single new file for the entire object within the object storage system. For example, the single new file may include a single inode storing information about the entire object within the object storage system.

Furthermore, in one embodiment, mapping all the data blocks associated with the plurality of segment files may include reassigning all of the data blocks associated with the plurality of segment files to the single inode of the single new file for the entire object. In this way, the single inode may identify all of the data blocks associated with the plurality of segment files. Also, while each of the plurality of segment files may represent a portion of the object stored within the object storage system, the single new file may represent the entire object stored within the object storage system.

Figure 5:
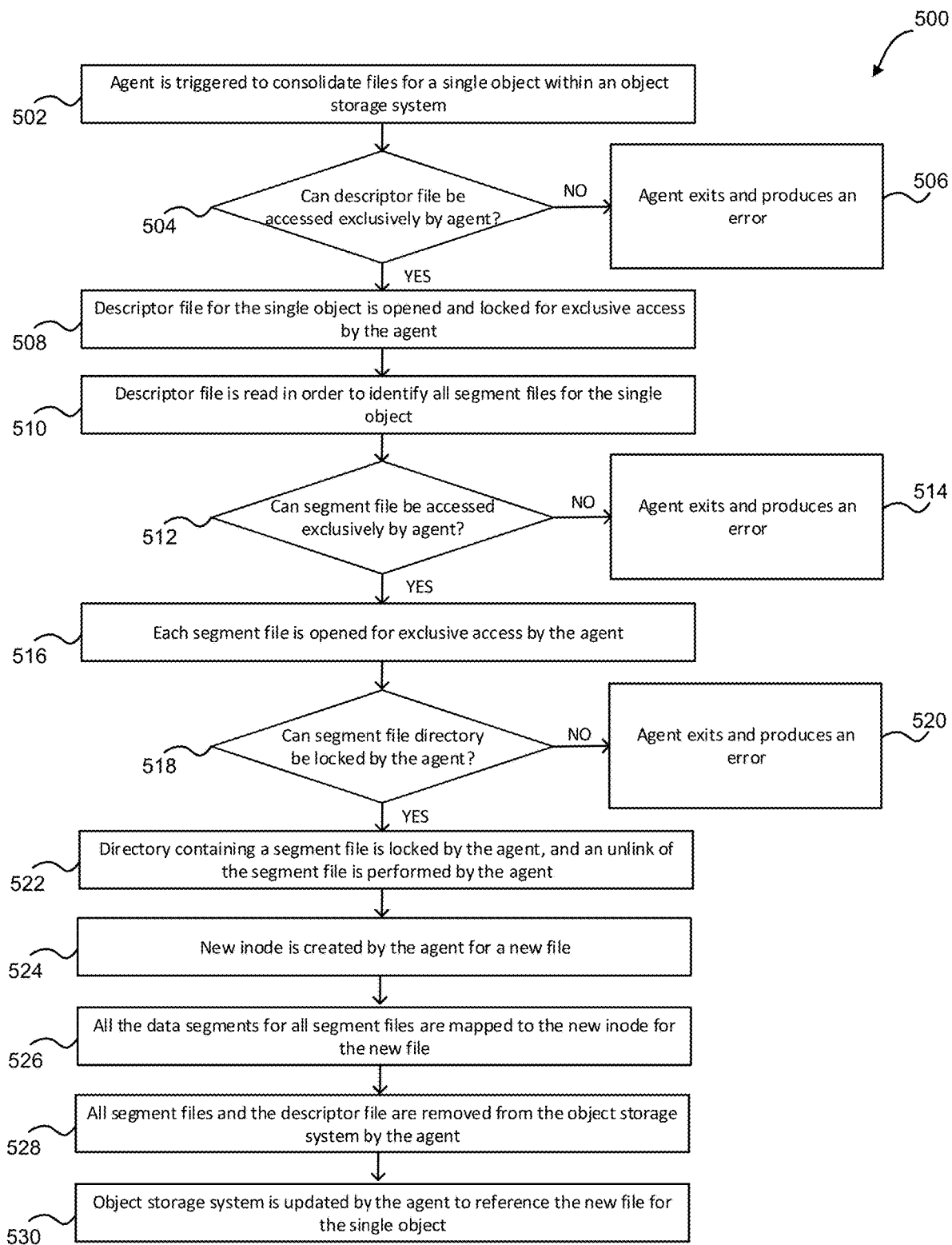
FIG. 5 illustrates a method for consolidating segment files for an object, in accordance with one embodiment.

Now referring to FIG. 5, a flowchart of a method 500 for consolidating segment files for an object is shown according to one embodiment. The method 500 may be performed in accordance with the present invention in any of the environments depicted in FIGS. 1-3, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where an agent is triggered to consolidate files for a single object within an object storage system. In one embodiment, the agent may be triggered in response to an identification of a descriptor file for the single object within the object storage system. In another embodiment, the agent may be triggered in response to a completion of an uploading of the files for the single object to the object storage system, a completion of an uploading of the descriptor file for the single object, etc.

Additionally, method 500 may proceed with decision 504, where it is determined whether the descriptor file can be accessed exclusively by the agent. For example, it may be determined whether one or more other entities (e.g., agents, applications, etc.) are currently accessing the descriptor file for the single object. If in decision 504 it is determined that the descriptor file cannot be accessed exclusively by the agent, then method 500 may proceed with operation 506, where the agent exits and produces an error.

Further, if in decision 504 it is determined that the descriptor file can be accessed exclusively by the agent, then method 500 may proceed with operation 508, where the descriptor file for the single object is opened and locked for exclusive access by the agent. Additionally, method 500 may proceed with operation 510, where the descriptor file is read in order to identify all segment files for the single object. For example, the descriptor file may list all of the segment files for the single object and may identify the segment files as being associated with the single object.

Further still, method 500 may proceed with decision 512, where it is determined for each segment file whether the segment file can be accessed exclusively by the agent. For example, it may be determined whether one or more other entities (e.g., agents, applications, etc.) are currently accessing one or more of the segment files identified within the descriptor file. If in decision 512 it is determined that the one or more segment files cannot be accessed exclusively by the agent, then method 500 may proceed with operation 514, where the agent exits and produces an error.

Also, if in decision 512 it is determined for each segment file that the segment file can be accessed exclusively by the agent, then method 500 may proceed with operation 516, where each segment file is opened for exclusive access by the agent. In addition, method 500 may proceed with decision 518, where it is determined for each segment file whether a directory containing the segment file can be locked by the agent. If in decision 518 it is determined that one or more directories cannot be locked by the agent, then method 500 may proceed with operation 520, where the agent exits and produces an error.

Furthermore, if in decision 518 it is determined for each segment file that the directory containing the segment file can be locked by the agent, method 500 may proceed with operation 522, where each directory containing a segment file is locked by the agent, and an unlink of the segment file is performed by the agent. Further still, method 500 may proceed with operation 524, where a new inode is created by the agent for a new file. Also, method 500 may proceed with operation 526, where all the data segments for all segment files are mapped to the new inode for the new file.

Also, method 500 may proceed with operation 528, where all segment files and the descriptor file are removed from the object storage system by the agent. For example, the agent may delete all the segment files and the descriptor file for the single object within the object storage system. Additionally, method 500 may proceed with operation 530, where the object storage system is updated by the agent to reference the new file for the single object.

In this way, a single new file may be linked to all data blocks for the single object within the object storage system. In one embodiment, within the object storage system, file system policies, data migration, and other actions may be performed on this single new file that represents the entirety of the single object. For example, the single new file may be migrated from the object storage system to offline storage (e.g., tape storage, etc.).

In another example, the single new file may be tiered to external cloud storage. In yet another example, the single new file may be moved from one storage pool to another storage pool within the object storage system. In still another example, the single new file may be stored within a single storage tier of the object storage system, such that a status may be provided for the single object, utilizing the single new file. In another embodiment, the single new file may be stored on tape storage, and a single tape recall may be sent to tape storage to retrieve all data blocks for the single object within tape storage.

Figure 6:
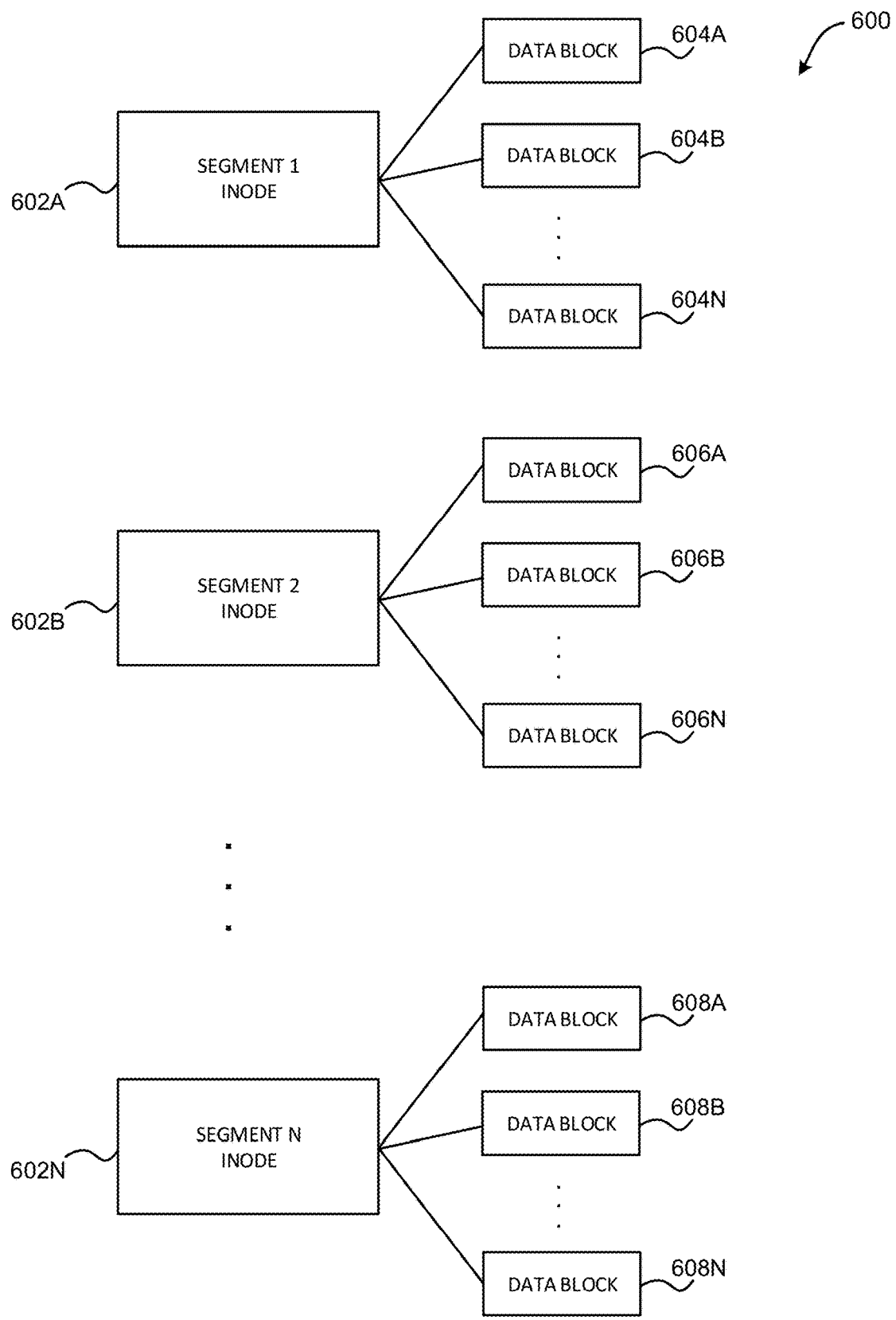
FIG. 6 illustrates an exemplary arrangement of a plurality of segment file inodes that is identified by an agent within an object storage system, in accordance with one embodiment.

FIG. 6 illustrates an exemplary arrangement 600 of a plurality of segment file inodes 602A-N that is identified by an agent within an object storage system, according to one embodiment. As shown, a single object within the object storage system is represented within the object storage system as the plurality of segment file inodes 602A-N. For example, a single file representing the single object may be divided into a plurality of segment files during an uploading of the single object to the object storage system.

Additionally, when uploaded to the object storage system, each of the plurality of segment files may include a respective one of the plurality of segment file inodes 602A-N. Each of the plurality of segment file inodes 602A-N identifies a plurality of data blocks. For example, a first segment file inode 602A may identify a first plurality of data blocks 604A-N that contain the data for the segment file associated with the first segment file inode 602A. Likewise, a second segment file inode 602B may identify a second plurality of data blocks 606A-N that contain the data for the segment file associated with the second segment file inode 602B, and an Nth segment file inode 602N may identify an Nth plurality of data blocks 608A-N that contain the data for the segment file associated with the Nth segment file inode 602N.

Further, in one embodiment, an agent within the object storage system may be triggered in response to an identification of a descriptor file within the object storage system. For example, a client may upload a single object to the object storage system as a plurality of segment files, and may upload a descriptor file for the single object to the object storage system in order to finish the upload of the single object. Once the descriptor file is identified within the object storage system, the agent may be triggered, and the agent may then access the descriptor file in order to identify the plurality of segment file inodes 602A-N.

Figure 7:
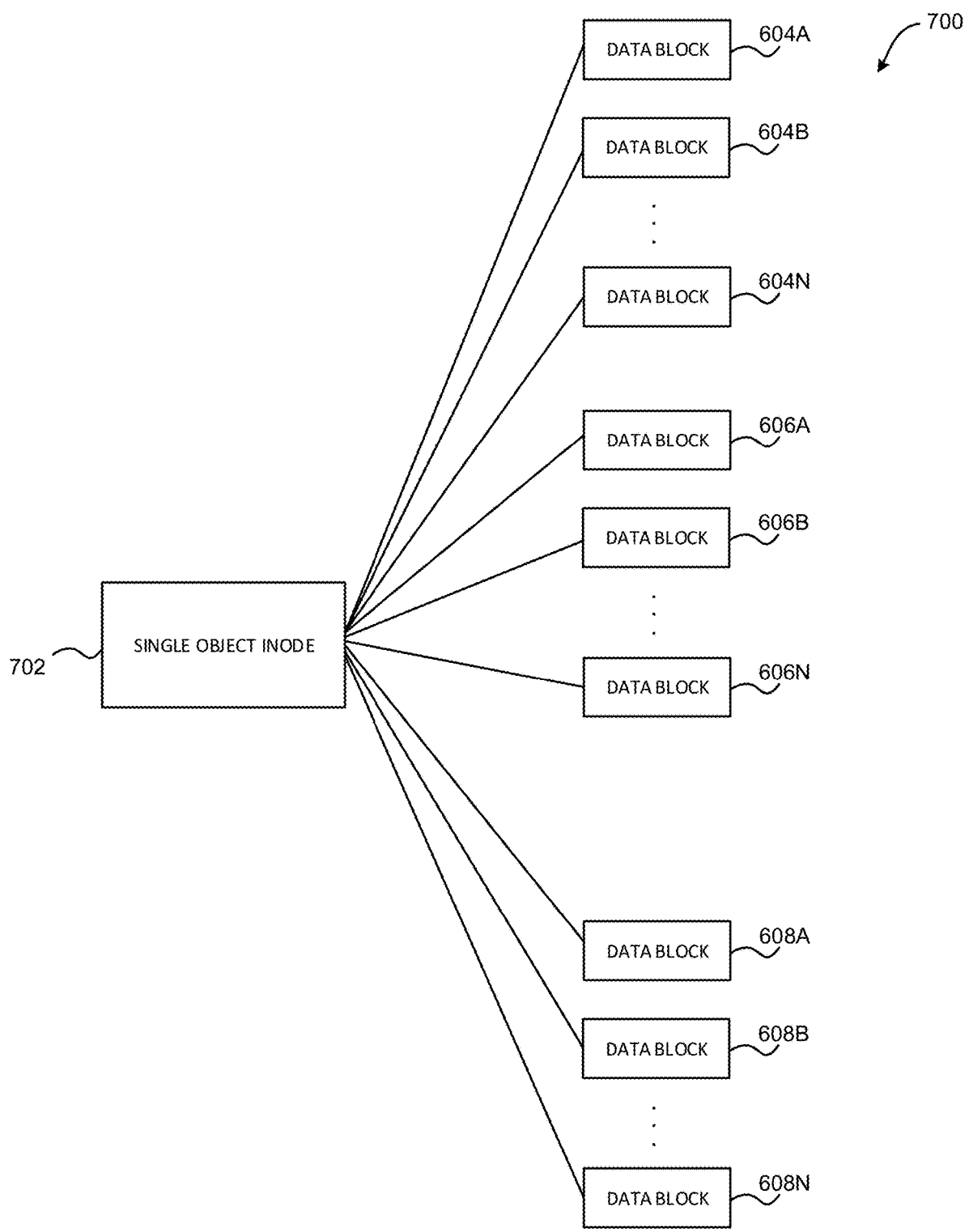
FIG. 7 illustrates an exemplary result of merging the plurality of segment file inodes from FIG. 6 into a single object inode, in accordance with one embodiment.

FIG. 7 illustrates an exemplary result 700 of merging the plurality of segment file inodes 602A-N from FIG. 6 into a single object inode 702, according to one embodiment. A shown, the single object inode 702 identifies all of the plurality of data blocks 604A-N, 606A-N, and 608A-N that were previously identified by the plurality of segment file inodes 602A-N from FIG. 6.

In one embodiment, after identifying the plurality of segment file inodes 602A-N of FIG. 6, utilizing a descriptor file for a single object, an agent may create a new single file that includes the single object inode 702. After unlinking the plurality of data blocks 604A-N, 606A-N, and 608A-N from the plurality of segment file inodes 602A-N of FIG. 6, the agent may map all of the plurality of data blocks 604A-N, 606A-N, and 608A-N to the single object inode 702. In this way, the single object inode 702 may point to all data blocks 604A-N, 606A-N, and 608A-N storing the single object within an object storage system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   identifying a plurality of segment files that have been uploaded to an object storage system;
   determining all data blocks associated with the plurality of segment files within the object storage system;
   mapping all the data blocks associated with the plurality of segment files to a single new file within the object storage system;
   in response to a completion of an uploading of a descriptor file associated with a single object to the object storage system, where the descriptor file identifies each of the plurality of segment files as belonging to the single object within the object storage system, identifying the plurality of segment files, utilizing the descriptor file;
   creating a new inode for the single new file;
   mapping all the data blocks associated with the plurality of segment files to the new inode for the single new file;
   removing all of the plurality of segment files and the descriptor file from the object storage system; and
   updating the object storage system to reference the single new file for the single object.

2. The computer-implemented method of claim 1, wherein each of the plurality of segment files represents a portion of an object stored within the object storage system.

3. The computer-implemented method of claim 1, wherein the object storage system includes a clustered file system that includes a shared file system mounted on a plurality of servers.

4. The computer-implemented method of claim 1, wherein:
   determining all the data blocks associated with the plurality of segment files includes determining, for each of the plurality of segment files, all data blocks identified within an inode for that segment file,
   for each of the plurality of segment files, the inode for that segment file identifies a location of all data blocks associated with that segment file, and
   for each of the plurality of segment files, the data blocks associated with that segment file indicate one or more physical locations within the object storage system where data for that segment file is stored.

5. The computer-implemented method of claim 1, comprising, for each of the plurality of segment files, locking a directory containing the segment file and unlinking the segment file.

6. The computer-implemented method of claim 1, wherein mapping all the data blocks associated with the plurality of segment files includes:
   creating the single new file for an entire object within the object storage system, where the single new file includes a single inode storing information about the entire object within the object storage system, and
   reassigning all of the data blocks associated with the plurality of segment files to the single inode of the single new file for the entire object.

7. The computer-implemented method of claim 1, comprising:
   determining that each of the plurality of segment files can be accessed exclusively;
   opening each of the plurality of segment files for exclusive access; and for each of the plurality of segment files, locking a directory containing the segment file and unlinking the segment file.

8. The computer-implemented method of claim 1, wherein identifying the plurality of segment files, utilizing the descriptor file, includes reading the descriptor file to identify the plurality of segment files.

9. The computer-implemented method of claim 1, comprising:
determining that each of the plurality of segment files can be accessed exclusively;
opening each of the plurality of segment files for exclusive access; and
for each of the plurality of segment files, locking a directory containing the segment file and unlinking the segment file;
wherein identifying the plurality of segment files, utilizing the descriptor file, includes:
determining that the descriptor file can be accessed exclusively,
opening the descriptor file for the single object,
locking the descriptor file for the single object for exclusive access, and
reading the descriptor file to identify the plurality of segment files.

10. A computer program product comprising one or more computer readable storage media, and program instructions collectively stored on the one or more computer readable storage media, the program instructions comprising instructions configured to cause one or more processors to perform a method comprising:
identifying a plurality of segment files that have been uploaded to an object storage system, utilizing the one or more processors;
determining all data blocks associated with the plurality of segment files within the object storage system, utilizing the one or more processors;
mapping all the data blocks associated with the plurality of segment files to a single new file within the object storage system, utilizing the one or more processors;
utilizing the one or more processors, in response to a completion of an uploading of a descriptor file associated with a single object to the object storage system, where the descriptor file identifies each of the plurality of segment files as belonging to the single object within the object storage system, identifying, utilizing the one or more processors, the plurality of segment files, utilizing the descriptor file;
creating, utilizing the one or more processors, a new inode for the single new file;
mapping, utilizing the one or more processors, all the data blocks associated with the plurality of segment files to the new inode for the single new file;
removing, utilizing the one or more processors, all of the plurality of segment files and the descriptor file from the object storage system; and
updating, utilizing the one or more processors, the object storage system to reference the single new file for the single object.

11. The computer program product of claim 10, wherein each of the plurality of segment files represents a portion of an object stored within the object storage system.

12. The computer program product of claim 10, wherein determining all the data blocks associated with the plurality of segment files includes determining, for each of the plurality of segment files, all data blocks identified within an inode for that segment file, utilizing the one or more processors.

13. The computer program product of claim 12, wherein for each of the plurality of segment files, the inode for that segment file identifies a location of all data blocks associated with that segment file.

14. A system, comprising:
a processor; and
logic integrated with the processor, executable by the processor, or integrated with and executable by the processor, the logic being configured to:
identify a plurality of segment files that have been uploaded to an object storage system;
determine all data blocks associated with the plurality of segment files within the object storage system;
map all the data blocks associated with the plurality of segment files to a single new file within the object storage system;
in response to a completion of an uploading of a descriptor file associated with a single object to the object storage system, where the descriptor file identifies each of the plurality of segment files as belonging to the single object within the object storage system, identify the plurality of segment files, utilizing the descriptor file;
create a new inode for the single new file;
map all the data blocks associated with the plurality of segment files to the new inode for the single new file;
remove all of the plurality of segment files and the descriptor file from the object storage system; and
update the object storage system to reference the single new file for the single object.

\* \* \* \* \*